US010236121B2

(12) United States Patent
Hattori et al.

(10) Patent No.: US 10,236,121 B2
(45) Date of Patent: Mar. 19, 2019

(54) CAPACITOR UNIT AND ELECTRIC POWER CONVERSION DEVICE

(71) Applicant: MITSUBISHI HEAVY INDUSTRIES THERMAL SYSTEMS, LTD., Tokyo (JP)

(72) Inventors: Makoto Hattori, Tokyo (JP); Hiroyuki Kamitani, Tokyo (JP); Hiroto Higuchi, Tokyo (JP); Takayuki Takashige, Tokyo (JP)

(73) Assignee: Mitsubishi Heavy Industries Thermal Systems, Ltd., Tokyo (JP)

( * ) Notice: Subject to any disclaimer, the term of this patent is extended or adjusted under 35 U.S.C. 154(b) by 0 days.

(21) Appl. No.: 15/781,758

(22) PCT Filed: Dec. 1, 2016

(86) PCT No.: PCT/JP2016/085819
§ 371 (c)(1),
(2) Date: Jun. 6, 2018

(87) PCT Pub. No.: WO2017/098997
PCT Pub. Date: Jun. 15, 2017

(65) Prior Publication Data
US 2018/0358177 A1 Dec. 13, 2018

(30) Foreign Application Priority Data

Dec. 8, 2015 (JP) ................... 2015-239380

(51) Int. Cl.
*H01G 4/224* (2006.01)
*H01G 2/04* (2006.01)
(Continued)

(52) U.S. Cl.
CPC ............... *H01G 2/04* (2013.01); *B60R 16/02* (2013.01); *H01G 2/103* (2013.01);
(Continued)

(58) Field of Classification Search
USPC .......................................... 361/782
See application file for complete search history.

(56) References Cited

U.S. PATENT DOCUMENTS

2011/0228508 A1* 9/2011 Inuduka ............... H02M 7/003
 361/811
2011/0304948 A1* 12/2011 Lee ..................... H01G 9/155
 361/301.1

(Continued)

FOREIGN PATENT DOCUMENTS

JP 2007-336761 A 12/2007
JP 2008-99397 A 4/2008

(Continued)

OTHER PUBLICATIONS

International Search Report and Written Opinion of the International Searching Authority (Forms PCT/ISA/220, PCT/ISA/210 and PCT/ISA/237) for Application No. PCT/JP2016/085819, dated Feb. 7, 2017, with English translation.

(Continued)

Primary Examiner — Dimary S Lopez Cruz
(74) Attorney, Agent, or Firm — Birch, Stewart, Kolasch & Birch, LLP

(57) ABSTRACT

A capacitor unit is integrally provided with: a capacitor main body; a pair of bus bars that are connected to a pair of corresponding electrodes of the capacitor main body; and a casing that internally contains the capacitor main body and the bus bars and is made of resin. The bus bars are each provided with an input terminal on a first end side to which a connection terminal of a high-voltage cable for DC power is connected, while being each provided with an output terminal on a second end side to which an inverter substrate is connected.

6 Claims, 6 Drawing Sheets

(51) Int. Cl.
   *H01G 2/10* (2006.01)
   *H01R 25/16* (2006.01)
   *B60R 16/02* (2006.01)
   *H02M 7/00* (2006.01)
   *H02M 7/537* (2006.01)

(52) U.S. Cl.
   CPC .......... *H01R 25/162* (2013.01); *H02M 7/003* (2013.01); *H02M 7/537* (2013.01)

(56) References Cited

U.S. PATENT DOCUMENTS

| | | | | |
|---|---|---|---|---|
| 2013/0113074 A1* | 5/2013 | Ebersberger | ............. | H01G 2/08 257/532 |
| 2014/0168869 A1* | 6/2014 | Jeong | ................... | H05K 7/1432 361/679.01 |
| 2014/0294045 A1* | 10/2014 | Hironaka | ................. | H01G 9/26 374/142 |
| 2014/0321090 A1* | 10/2014 | Guerin | .................. | H02M 7/003 361/782 |

FOREIGN PATENT DOCUMENTS

| | | |
|---|---|---|
| JP | 2008-130640 A | 6/2008 |
| JP | 2014-116446 A | 6/2014 |
| JP | 2014-168011 A | 9/2014 |
| JP | 2014-230288 A | 12/2014 |
| JP | 2015-95611 A | 5/2015 |

OTHER PUBLICATIONS

Office Action dated Jul. 10, 2018 issued in corresponding Japanese Patent Application No. 2015-239380 with a machine translation.
Office Action dated Nov. 6, 2018 in corresponding Japanese Patent Application No. 2015-239380 with a machine translation.

* cited by examiner

CAPACITOR UNIT AND ELECTRIC POWER CONVERSION DEVICE

TECHNICAL FIELD

The present invention relates to a capacitor unit and an electric power conversion device including the capacitor unit.

BACKGROUND ART

For example, electric compressors, which integrally incorporate electric power conversion devices, are used as air conditioners installed in electric vehicles, hybrid vehicles, and the like. This kind of electric compressor is configured so that high-voltage DC power supplied from a power supply unit installed in a vehicle is converted to three-phase AC power of a required frequency in an electric power conversion device, which is then applied to the electric compressor so that the electric compressor is driven.

As this kind of electric power conversion device, conventionally, a technology has been proposed including a bus bar integrally formed with a capacitor module, the technology includes a semiconductor module, a bus bar connected to a DC power supply terminal of the semiconductor module to supply DC power to the semiconductor module, and a capacitor module electrically connected to the bus bar (for example, see Patent Document 1).

CITATION LIST

Patent Document

Patent Document 1: JP 2007-336761 A

SUMMARY OF INVENTION

Technical Problems

However, in the conventional configuration, the bus bar is connected to the outside of the capacitor module and is integrally formed with the capacitor module, and a power cable and the semiconductor module are connected to the bus bar. Thus, the capacitor module to which the bus bar is connected increases in size. As a result, the electric power conversion device increases in size.

The present invention has been made in view of the above-described problems, and an object thereof is to provide a capacitor unit and an electric power conversion device that achieve size reduction.

Solution to Problems

To solve the above-described problems and achieve the object, a capacitor unit according to an embodiment of the present invention integrally includes a capacitor main body, a pair of bus bars, and a casing. The pair of bus bars are connected to a pair of corresponding electrodes of the capacitor main body. The casing internally contains the capacitor main body and the pair of bus bars and is made of resin. The pair of bus bars each include an input terminal on a first end side to which a power cable for DC power is connected and an output terminal on a second end side to which a circuit board is connected.

This configuration allows the capacitor main body, the input terminals, and the output terminals to be compactly disposed in the casing, thus achieving size reduction of the capacitor unit.

The bus bars may be insert-molded to the casing. This configuration allows the bus bars to be easily disposed in a position avoiding the capacitor main body and thus easily achieving size reduction of the capacitor unit.

The casing may have a box shape including a housing portion with an opening in an upper surface. The capacitor main body may be housed in the housing portion and fixed with a resin material. This configuration allows watertightness of the capacitor unit to be improved by covering the capacitor main body housed in the casing with the resin material.

The casing may include an input terminal supporting portion that supports the input terminals and a fixing portion aligned with the input terminal supporting portion and that fixes the casing to a fixing subject. This configuration allows, for example, the capacitor unit to be easily attached and fixed to the fixing subject such as an external device.

The fixing portion may be a ground terminal portion to which a shielded cable for DC power is connectable. This configuration allows an attachment configuration to be simplified by the fixing portion taking part in both attaching the capacitor unit and reducing noise of DC power supplied to the capacitor unit.

The casing may include an output terminal supporting portion that protrudes from a side of the casing and supports the output terminals. The output terminal supporting portion may be formed at a height position lower than an upper surface of the casing. This configuration allows the circuit board to be connected with the output terminals while a part of the circuit board is placed on the output terminal supporting portion. Thus, the circuit board can be disposed adjacent to the capacitor unit. Accordingly, an area of the circuit board can be reduced, and cost reduction and size reduction can be achieved.

An electric power conversion device according to an embodiment of the present invention may include the capacitor unit described above and an inverter substrate connected to the output terminals of the capacitor unit and configured to convert DC power supply into three-phase AC power supply. This configuration allows the size of the electric power conversion unit to be reduced, thus achieving size reduction of the capacitor unit.

Advantageous Effects of Invention

An embodiment of the present invention allows a capacitor main body, an input terminal, and an output terminal to be compactly disposed in a casing, thus achieving size reduction of a capacitor unit.

DESCRIPTION OF EMBODIMENTS

An embodiment according to the present invention will be described below on the basis of the drawings. Note that the present invention is not limited by the embodiment. In addition, the constituent elements in the embodiment include those that can be easily replaced by a person skilled in the art or those that are substantially the same. The various constituent elements described hereafter may also be combined, as appropriate.

Figure 1:
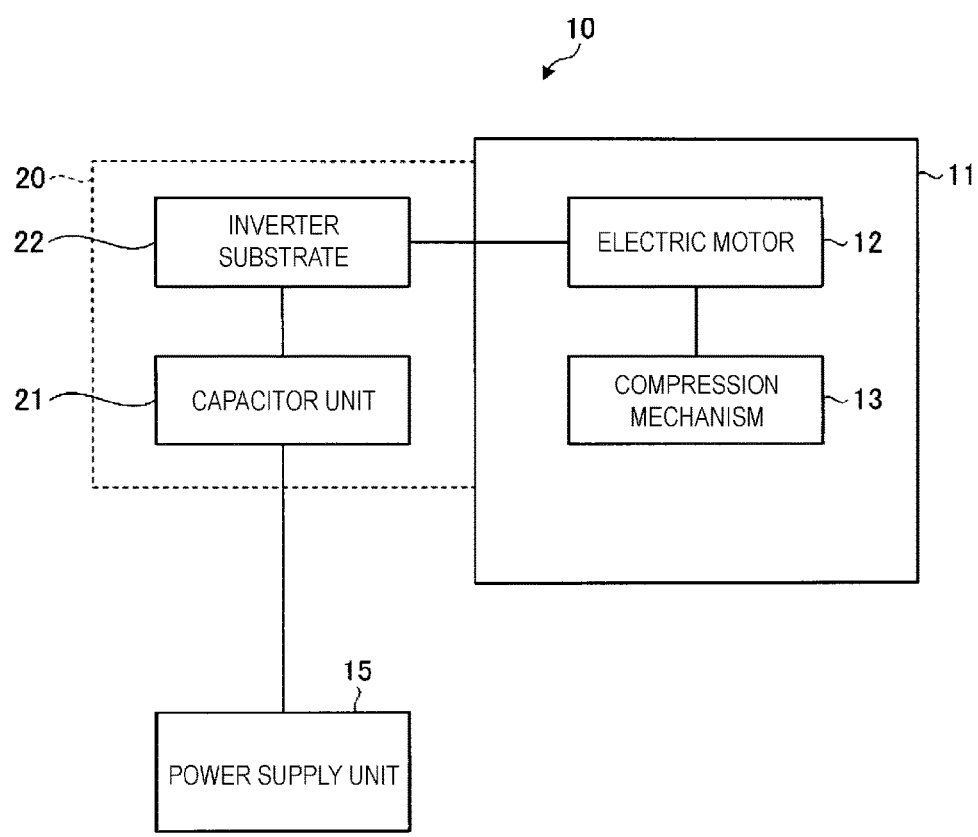
FIG. 1 is a schematic configuration diagram illustrating an example of a vehicle-mounted electric compressor including an electric power conversion device according to the present embodiment.

FIG. 1 is a schematic configuration diagram illustrating an example of a vehicle-mounted electric compressor including an electric power conversion device according to the present embodiment. A vehicle-mounted electric compressor 10 is a device constituting an air conditioner (not illustrated) installed in a vehicle. The vehicle-mounted electric compressor 10 takes in low-pressure refrigerant circulating in a refrigerant circuit of the air conditioner, compresses the refrigerant, and discharges the refrigerant into the refrigerant circuit again. The vehicle-mounted electric compressor 10 includes a housing 11 constituting an outer shell and an electric motor 12 and a compression mechanism 13 internally contained in the housing 11. The compression mechanism 13 is connected to the electric motor 12 via a rotating shaft and is driven by rotational driving of the electric motor 12.

The vehicle-mounted electric compressor 10 includes an electric power conversion device 20 supplying power to the electric motor 12. The electric power conversion device 20 is attached to the housing 11 of the vehicle-mounted electric compressor 10 and is integrally formed with the vehicle-mounted electric compressor 10. The electric power conversion device 20 drives the electric motor 12 by converting DC power supplied from a power supply unit 15, such as a battery, installed in the vehicle into three-phase AC power of a required frequency and then applying the three-phase AC power to the electric motor 12. The electric power conversion device 20 includes a capacitor unit 21 and an inverter substrate 22. The capacitor unit 21 removes a ripple component superimposed on the DC power supplied from the power supply unit 15 and smoothes the DC power. The capacitor unit 21 then outputs the smoothed DC power to the inverter substrate 22. The inverter substrate 22 converts the smoothed DC power into three-phase AC power and applies the three-phase AC power to the electric motor 12 of the vehicle-mounted electric compressor 10. The inverter substrate 22 controls operations of the electric power conversion device 20 on the basis of a control signal from an ECU (not illustrated) installed in the vehicle.

Figure 2:
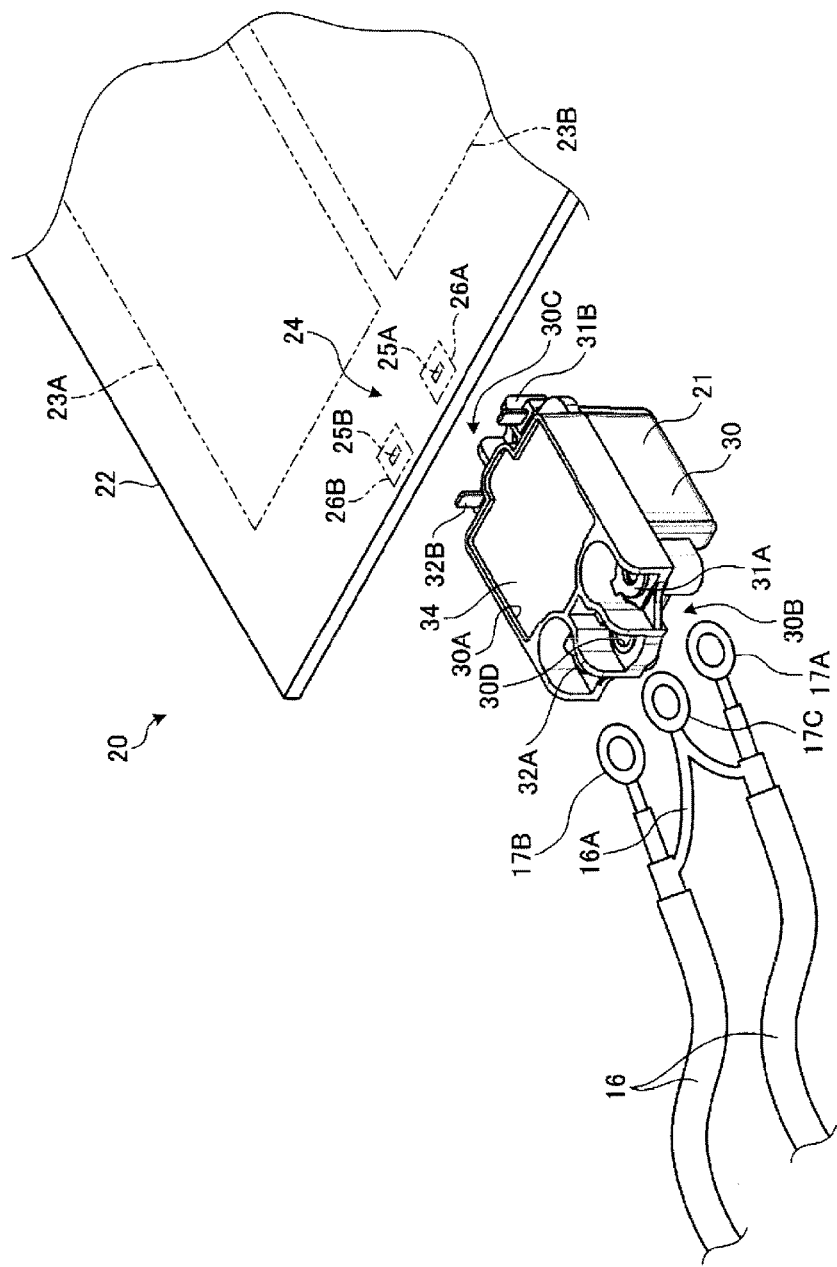
FIG. 2 is a perspective view illustrating a configuration of arrangement of a capacitor unit and an inverter substrate that constitute the electric power conversion device.
Figure 3:
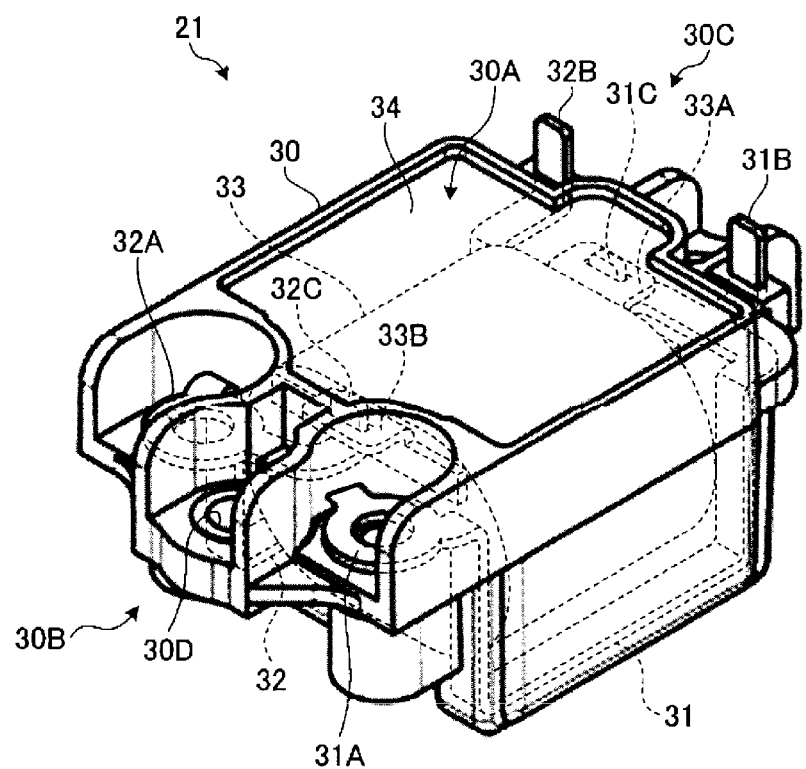
FIG. 3 is a perspective view of an inside of the capacitor unit.
Figure 4:
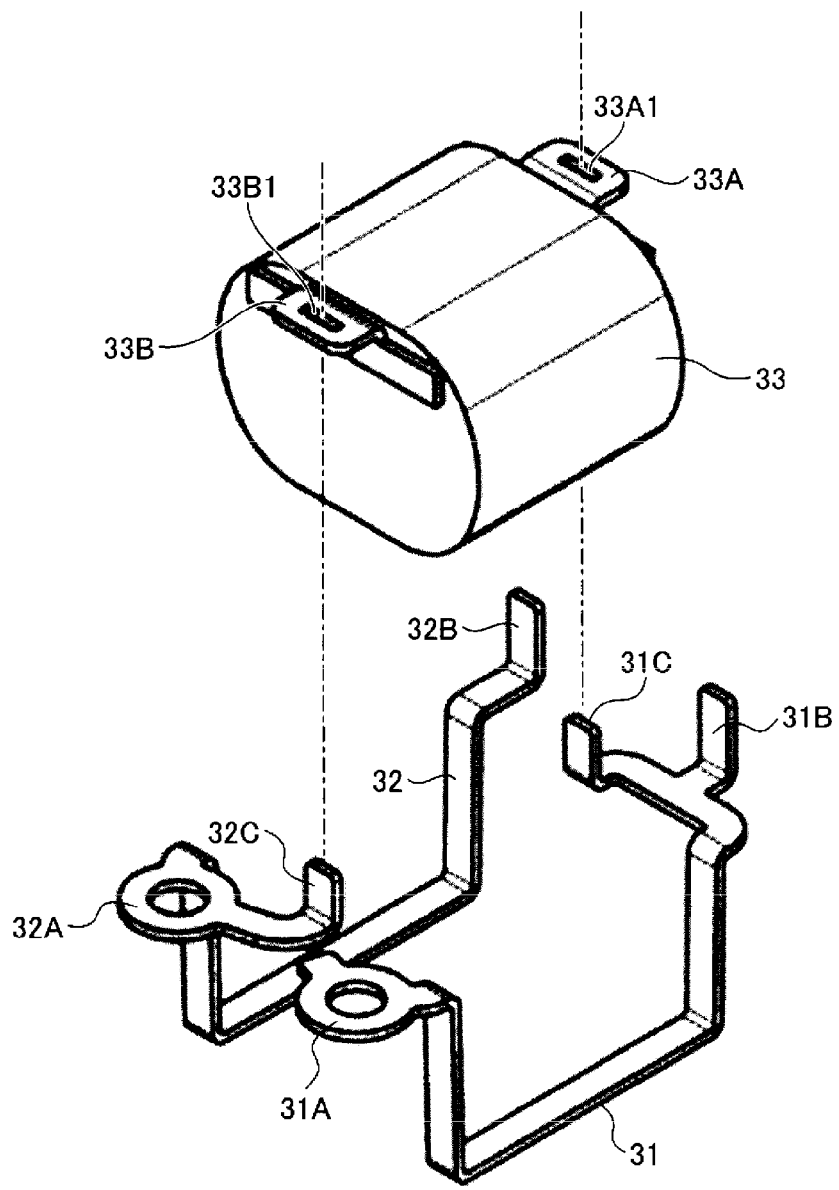
FIG. 4 is an exploded perspective view illustrating a capacitor main body and a bus bar housed in a casing of the capacitor unit.
Figure 5:
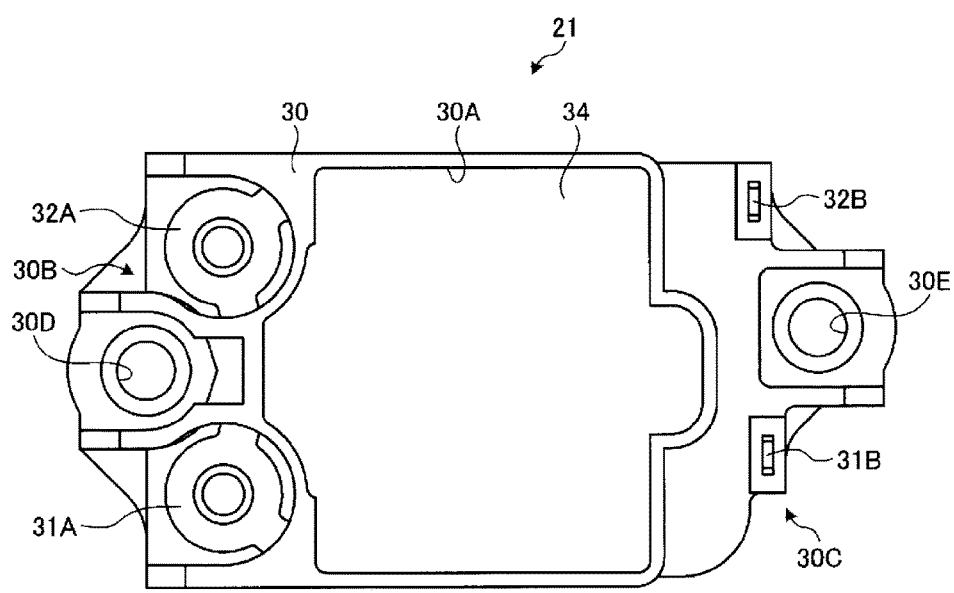
FIG. 5 is a plan view of the capacitor unit.

FIG. 2 is a perspective view illustrating a configuration of arrangement of the capacitor unit and the inverter substrate that constitute the electric power conversion device. FIG. 3 is a perspective view of an inside of the capacitor unit. FIG. 4 is an exploded perspective view illustrating a capacitor main body and a bus bar housed in a casing of the capacitor unit. FIG. 5 is a plan view of the capacitor unit.

As illustrated in FIG. 2, a switching circuit 23A constituted by a plurality of switching elements (not illustrated) such as IGBTs configured to convert DC power into three-phase AC power and a control circuit 23B configured to control the switching circuit 23A and the like are provided on the inverter substrate 22. The inverter substrate 22 is provided with a PN terminal portion 24 to which DC power is input. The PN terminal portion 24 penetrates the inverter substrate 22, includes a pair of holes 25A, 25B aligned along one side edge of the inverter substrate 22, and includes land portions 26A, 26B respectively formed around the holes 25A, 25B on a surface of the inverter substrate 22. The inverter substrate 22 is provided with a UVW terminal portion (not illustrated) that outputs three-phase AC power of a required frequency converted from DC power.

On the other hand, as illustrated in FIGS. 2 and 3, the capacitor unit 21 has an outer shape having a substantially rectangular shape (cuboid shape) and includes a pair of input terminals 31A, 32A and a pair of output terminals 31B, 32B. Connection terminals 17A, 17B of high-voltage cables (power cables) 16 extending from the power supply unit 15 (FIG. 1) are connected to the input terminals 31A, 32A, respectively. The input terminals 31A, 32A and the connection terminals 17A, 17B each have an annular shape. The connection terminals 17A, 17B are fixed to the input terminals 31A, 32A with screws (not illustrated), respectively. The output terminals 31B, 32B have a nail-like shape protruding upward, and are directly inserted into the above-described holes 25A, 25B of the inverter substrate 22 and soldered to the land portions 26A, 26B, respectively. Accordingly, the capacitor unit 21 is mounted to the inverter substrate 22 with the output terminals 31B, 32B.

As illustrated in FIG. 3, the capacitor unit 21 includes a casing 30 made of resin, a pair of bus bars 31, 32 internally contained in the casing 30, and a capacitor main body (also referred to as "element") 33. The casing 30 has a box shape including a housing portion 30A with an opening in an upper surface. An input terminal supporting portion 30B that supports the above-described input terminals 31A, 32A in an exposed state is integrally provided on one of side portions of the housing portion 30A. The casing 30 integrally includes an output terminal supporting portion 30C that supports the above-described output terminals 31B, 32B in an exposed state on a side portion of the housing portion 30A located opposite to the input terminal supporting portion 30B.

As illustrated in FIGS. 3 and 4, the bus bars 31, 32 are each formed by bending a long plate member. The bus bars 31, 32 are bent conforming to the shape of the housing portion 30A of the casing 30 and are insert-molded to the casing 30. This configuration allows the bus bars 31, 32 to be easily disposed in a position avoiding a space in the housing portion 30A. As illustrated in FIG. 4, the one bus bar 31 includes the above-described input terminal 31A on a first end side, and includes the above-described output terminal 31B and a capacitor connection terminal 31C on a second end side. The other bus bar 32 includes the above-described input terminal 32A and a capacitor connection terminal 32C on the first end side, and includes the above-described output terminal 32B on the second end side. The capacitor connection terminals 31C, 32C are bent so as to protrude upward and be exposed in the housing portion 30A in positions facing each other.

As illustrated in FIG. 3, the capacitor main body 33 has a shape like a substantially elliptic cylinder laid sideways, and is housed in the housing portion 30A of the casing 30. As illustrated in FIG. 4, the capacitor main body 33 includes electrodes 33A, 33B each located on a side surface portion having the elliptical shape. The electrodes 33A, 33B include holes 33A1, 33B1 into which the capacitor connection terminals 31C, 32C are inserted, respectively. The capacitor connection terminals 31C, 32C are exposed in the housing portion 30A of the casing 30, so that the capacitor connection terminals 31C, 32C are respectively inserted into the holes 33A1, 33B1 of the electrodes when the capacitor main body 33 is housed in the housing portion 30A. The electrodes 33A, 33B are respectively fixed to the capacitor connection terminals 31C, 32C by soldering. Then, a resin material 34 (FIG. 3) in a liquid state having curability is injected into the housing portion 30A. The resin material 34 is cured, thus fixing the capacitor main body 33 to the housing portion 30A. This configuration allows watertightness of the capacitor unit 21 to be improved by covering the capacitor main body 33 and the capacitor connection terminals 31C, 32C housed in the housing portion 30A of the casing 30 with the resin material 34.

As illustrated in FIG. 5, the casing 30 includes fixing holes (fixing portions) 30D, 30E that are aligned with the input terminal supporting portion 30B and the output terminal supporting portion 30C, respectively, and fix the casing 30. The fixing holes 30D, 30E vertically penetrate the casing 30 and are used when, for example, the capacitor unit is directly or indirectly screwed to the housing 11 (fixing subject, FIG. 1) of the vehicle-mounted electric compressor 10. In the present embodiment, as illustrated in FIG. 2, a ground terminal 17C of a shielded cable 16A integrally provided to the high-voltage cables 16 is configured to be connectable to the fixing hole 30D on the input terminal supporting portion 30B side. The ground terminal 17C is grounded via a fixing screw and the housing 11, so that the fixing hole 30D functions as a ground terminal supporting portion.

Figure 6:
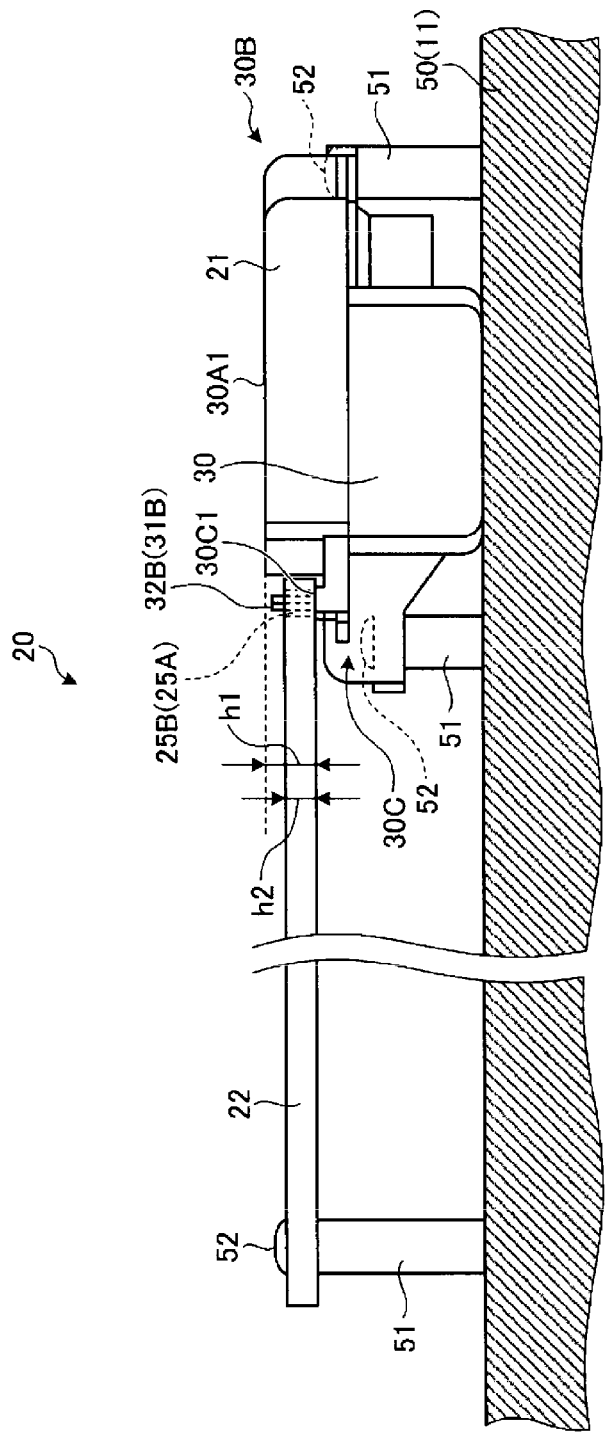
FIG. 6 is a side view illustrating a state in which the electric power conversion device is installed.

Next, a configuration of installation of the electric power conversion device 20 will be described. FIG. 6 is a side view illustrating a state in which the electric power conversion device is installed. The electric power conversion device 20 is attached to the inside of a control box 50 provided in the housing 11 of the vehicle-mounted electric compressor 10. The control box 50 includes a plurality of support legs 51 for attaching the capacitor unit 21 and the inverter substrate 22. The capacitor unit 21 and the inverter substrate 22 are attached to the support legs 51 with screws 52.

As illustrated in FIG. 6, the output terminal supporting portion 30C of the capacitor unit 21 is formed protruding from the side of the casing 30 in this configuration. The output terminal supporting portion 30C is provided at a portion lower than an upper surface 30A1 of the casing 30. Specifically, the output terminal supporting portion 30C is formed at a height position lower than the upper surface 30A1 of the casing 30 by at least greater than or equal to a distance in a thickness direction of the inverter substrate 22. In other words, a height h1 from the upper surface 30A1 of the casing 30 to an upper surface 30C1 of the output terminal supporting portion 30C is formed to be greater than at least a thickness h2 of the inverter substrate 22. Thus, while a part of the inverter substrate 22 is placed on the upper surface 30C1 of the output terminal supporting portion 30C, the output terminals 31B, 32B can be connected to the inverter substrate 22 by passing through the holes 25A, 25B of the inverter substrate 22. In this case, inverter substrate 22 can be suppressed from extending in a height direction higher than the capacitor unit 21.

This allows the inverter substrate 22 to be arranged side by side adjacent to the capacitor unit 21. Accordingly, for example, while the inverter substrate can be made smaller than the inverter substrate on which the capacitor unit is mounted, the size of the capacitor unit and the inverter substrate in a thickness direction can be smaller. For example, compared to a case where the capacitor unit and the inverter substrate are connected to each other with bus bars, at least an installation area of the capacitor unit and the inverter substrate can be made smaller by omitting the bus bars extending on the outside. In this way, the output terminal supporting portion 30C protrudes from the side of the casing 30 and is provided at the portion lower than the upper surface 30A1 of the casing 30 in the present embodiment, so that the inverter substrate 22 can be arranged side by side adjacent to the capacitor unit 21. Accordingly, the area of the inverter substrate 22 can be reduced, and size reduction and cost reduction of the electric power conversion device 20 can be achieved.

As described above, the capacitor unit 21 in the present embodiment integrally includes the capacitor main body 33, the pair of bus bars 31, 32, and the casing 30. The pair of bus bars 31, 32 are connected to the pair of electrodes 33A, 33B of the capacitor main body 33, respectively. The casing 30 internally contains the capacitor main body 33 and the bus bars 31, 32 and is made of resin. The bus bars 31, 32 respectively include the input terminals 31A, 32A on the first end side and the output terminals 31B, 32B on the second end side. The connection terminals 17A, 17B of the high-voltage cables 16 for DC power are respectively connected to the input terminals 31A, 32A. The PN terminal portion 24 of the inverter substrate 22 is connected to the output terminals 31B, 32B. This can thus allow the capacitor main body 33, the input terminals 31A, 32A, and the output terminals 31B, 32B to be compactly disposed in the casing 30 and achieve size reduction of the capacitor unit 21.

According to the present embodiment, the bus bars 31, 32 are insert-molded to the casing 30, so that the bus bars 31, 32 can be easily disposed in the position avoiding the capacitor main body 33, and size reduction of the capacitor unit 21 can be easily achieved.

According to the present embodiment, the casing 30 has the box shape including the housing portion 30A with the opening in the upper surface 30A1, and the capacitor main body 33 is housed in the housing portion 30A and fixed with the resin material 34. This can improve watertightness of the capacitor unit 21 by covering the capacitor main body 33 housed in the housing portion 30A of the casing 30 with the resin material 34.

According to the present embodiment, the casing 30 includes the input terminal supporting portion 30B, 30B that supports the input terminals 31A, 32A and the fixing hole 30D that is aligned with the input terminal supporting portion 30B, 30B and fixes the casing 30 to the housing 11. Thus, the capacitor unit 21 can be easily attached and fixed to, for example, the housing 11 of the vehicle-mounted electric compressor 10.

According to the present embodiment, the fixing hole 30D serves as the ground terminal portion to which the shielded cable 16A of the high-voltage cables 16 is connectable. This can simplify an attachment configuration by the fixing hole 30D taking part in both attaching the capacitor unit 21 and also reducing noise of DC power supplied to the capacitor unit 21.

According to the present embodiment, the casing 30 includes the output terminal supporting portion 30C that protrudes from the side of the casing 30 and supports the output terminals 31B, 32B. The output terminal supporting portion 30C is formed at the height position lower than the upper surface 30A1 of the casing 30. In this way, the inverter substrate 22 and the output terminals 31B, 32B can be connected to each other while the part of the inverter substrate 22 is placed on the output terminal supporting portion 30C. Thus, the inverter substrate 22 can be arranged side by side adjacent to the capacitor unit 21. Accordingly, the area of the inverter substrate 22 can be reduced, and cost reduction and size reduction of the electric power conversion device 20 can be achieved.

In the foregoing, one embodiment of the present invention has been described, but the present embodiment is merely illustrative and is not intended to limit the scope of the invention. The present embodiment may be implemented in various other forms, and various omissions, substitutions, and alterations may be made without departing from the gist of the invention. The present embodiment and modifications are included in the scope and gist of the invention and are also included in the scope of the invention described in the claims and equivalents thereof. In the present embodiment, the electric power conversion device 20 is provided in the vehicle-mounted electric compressor 10. However, the electric power conversion device 20 can be provided in other devices that uses three-phase AC power converted from DC power.

REFERENCE SIGNS LIST

10 Vehicle-mounted electric compressor
11 Housing (fixing subject)
12 Electric motor
13 Compression mechanism
15 Power supply unit
16 High-voltage cable (power cable)
16A Shielded cable
17A, 17B Connection terminal
17C Ground terminal
20 Electric power conversion device
21 Capacitor unit
22 Inverter substrate
24 PN terminal portion
25A, 25B Hole
26A, 26B Land portion
30 Casing
30A Housing portion
30A1 Upper surface
30B Input terminal supporting portion
30C Output terminal supporting portion
30D Fixing hole (fixing portion, ground terminal supporting portion)
30E Fixing hole (fixing portion)
31, 32 Bus bar
31A, 32A Input terminal
31B, 32B Output terminal
31C, 32C Capacitor connection terminal
33 Capacitor main body
33A, 33B Electrode
34 Resin material

The invention claimed is:

1. A capacitor unit comprising:
a capacitor main body;
a pair of bus bars connected to a pair of corresponding electrodes of the capacitor main body;
a casing that internally contains the capacitor main body and the pair of bus bars and is made of resin,
the capacitor main body, the pair of bus bars, and the casing being integrally provided, wherein
the pair of bus bars each include an input terminal on a first end side to which a power cable for DC power is connected and an output terminal on a second end side to which a circuit board is connected, and
the casing includes an input terminal supporting portion that supports the input terminals and a fixing portion that is aligned with the input terminal supporting portion and fixes the casing to a fixing subject.

2. The capacitor unit according to claim 1, wherein the pair of bus bars are insert-molded to the casing.

3. The capacitor unit according to claim 1, wherein
the casing has a box shape including a housing portion with an opening in an upper surface, and
the capacitor main body is housed in the housing portion and fixed with a resin material.

4. The capacitor unit according to claim 1, wherein the fixing portion is a ground terminal supporting portion to which a shielded cable for the DC power is connectable.

5. The capacitor unit according to claim 1, wherein
the casing includes an output terminal supporting portion that protrudes from a side of the casing and supports the output terminals, and
the output terminal supporting portion is formed at a height position lower than an upper surface of the casing.

6. An electric power conversion device comprising:
the capacitor unit according to claim 1; and
an inverter substrate connected to the output terminals of the capacitor unit and serves as the circuit board configured to convert DC power supply into three-phase AC power supply.

* * * * *